(12) United States Patent
Shen et al.

(10) Patent No.: US 9,515,972 B2
(45) Date of Patent: Dec. 6, 2016

(54) INTELLIGENT MESSAGE ROUTING AND DELIVERY IN A TELECOMMUNICATIONS NETWORK

(71) Applicant: AT&T Mobility II LLC, Atlanta, GA (US)

(72) Inventors: Jun Shen, Redmond, WA (US); Loc Yu, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 205 days.

(21) Appl. No.: 14/512,731

(22) Filed: Oct. 13, 2014

(65) Prior Publication Data

US 2015/0032833 A1 Jan. 29, 2015

Related U.S. Application Data

(63) Continuation of application No. 13/285,027, filed on Oct. 31, 2011, now Pat. No. 8,868,665.

(51) Int. Cl.
*H04L 12/58* (2006.01)
*H04W 4/12* (2009.01)

(52) U.S. Cl.
CPC ............ *H04L 51/10* (2013.01); *H04L 51/066* (2013.01); *H04W 4/12* (2013.01); *H04L 51/36* (2013.01)

(58) Field of Classification Search
None
See application file for complete search history.

(56) References Cited

U.S. PATENT DOCUMENTS

| 5,440,613 | A | * | 8/1995 | Fuentes | H04M 3/42229 370/331 |
| 5,978,672 | A | | 11/1999 | Hartmaier et al. | |
| 6,298,232 | B1 | | 10/2001 | Marin et al. | |
| 6,611,516 | B1 | | 8/2003 | Pirkola et al. | |
| 6,826,173 | B1 | * | 11/2004 | Kung | H04L 12/14 370/261 |
| 6,920,478 | B2 | * | 7/2005 | Mendiola | G06Q 10/107 709/203 |

(Continued)

OTHER PUBLICATIONS

U.S. Office Action dated Jan. 16, 2014 in U.S. Appl. No. 13/285,027.

(Continued)

*Primary Examiner* — Ranodhi Serrao
(74) *Attorney, Agent, or Firm* — Hartman & Citrin LLC

(57) ABSTRACT

Messages directed to a mobile device are selectively routed to message servers based upon the capabilities of a network to which the mobile device is connected. According to an illustrative method disclosed herein, a network connectivity server receives a network identifier from the mobile device, the network connectivity server receives a request for routing instructions for the message, and the network connectivity server determines if the network identified by the network identifier is capable of delivering the message. The network connectivity server then instructs the message server to route the message according to a standard delivery method for a message type of the message or to a message conversion server computer based upon the determination. The message conversion server computer converts the message into a new message type that the network is capable of delivering to the mobile device.

15 Claims, 9 Drawing Sheets

(56) References Cited

U.S. PATENT DOCUMENTS

| | | | |
|---|---|---|---|
| 7,386,517 B1 * | 6/2008 | Donner | G06Q 10/02 705/14.14 |
| 7,415,424 B1 * | 8/2008 | Donner | G06Q 10/02 235/382 |
| 7,536,183 B2 | 5/2009 | Loganathan et al. | |
| 7,565,328 B1 * | 7/2009 | Donner | G06Q 10/02 705/5 |
| 7,577,620 B1 * | 8/2009 | Donner | G06Q 10/02 705/5 |
| 8,489,130 B2 * | 7/2013 | Shaw | H04L 12/589 455/412.2 |
| 8,775,526 B2 * | 7/2014 | Lorch | H04M 1/7253 455/556.1 |
| 2002/0143916 A1 * | 10/2002 | Mendiola | G06Q 10/107 709/223 |
| 2004/0196858 A1 | 10/2004 | Tsai et al. | |
| 2005/0197142 A1 | 9/2005 | Major | |
| 2007/0223444 A1 | 9/2007 | Foo et al. | |
| 2008/0188250 A1 | 8/2008 | Agarwal et al. | |
| 2009/0129372 A1 | 5/2009 | Pandey et al. | |
| 2010/0179991 A1 * | 7/2010 | Lorch | H04M 1/7253 709/206 |
| 2010/0226362 A1 | 9/2010 | Kim et al. | |
| 2010/0304717 A1 | 12/2010 | Bhatt et al. | |
| 2011/0117939 A1 * | 5/2011 | Shaw | H04L 12/589 455/466 |
| 2011/0289161 A1 * | 11/2011 | Rankin, Jr. | G06Q 10/107 709/206 |
| 2014/0082104 A1 * | 3/2014 | Mann | H04L 51/046 709/206 |
| 2014/0325000 A1 * | 10/2014 | Lorch | H04M 1/7253 709/206 |

OTHER PUBLICATIONS

U.S. Notice of Allowance dated Jun. 9, 2014 in U.S. Appl. No. 13/285,027.

* cited by examiner

INTELLIGENT MESSAGE ROUTING AND DELIVERY IN A TELECOMMUNICATIONS NETWORK

CROSS-REFERENCE TO RELATED APPLICATIONS

This application is a continuation of U.S. application Ser. No. 13/285,027, entitled "Intelligent Message Routing and Delivery in a Telecommunications Network," filed on Oct. 31, 2011, now U.S. Pat. No. 8,868,665, the contents of which is incorporated herein by reference in its entirety.

BACKGROUND

Mobile messaging is available through many different messaging technologies. From traditional voice mail messages, to short messaging service ("SMS") messages, multimedia messing service ("MMS") messages, email messages, instant messaging ("IM") service messages, and social networking status messages, mobile device users are increasingly relying on multiple messaging technologies to communicate with their friends, families, and colleagues. To modern mobile device users, the difference between these message types should become blurred because the content of the message is often important to the user, not the method by which the message was delivered. However, due to the underlying technology differences used to route and deliver various messages, the availability of messages is often reliant upon the type of network to which a user's mobile device is connected, the condition of the connection, and potentially other factors, such as whether the mobile device is roaming. This may cause messages to be delayed, resulting in an unintelligible or out-of-date message being sent to the recipient. In some instances, the messages may not be delivered at all, such as when a SMS message is available for the mobile device, but the mobile device is only connected to a wireless local area network via WI-FI.

It is with respect to these and other considerations that the disclosure made herein is presented.

SUMMARY

Concepts and technologies are described herein for intelligent message routing and delivery in a telecommunications network. According to one aspect disclosed herein, a method for providing routing instructions to a message server for routing a message to a mobile device may include receiving a network identifier from the mobile device. The network identifier may identify a network to which the mobile device is connected. The method may further include receiving a request for routing instructions for the message, and determining if the network identified by the network identifier is capable of delivering the message. In some embodiments, the capability of the network may include the capability of the network for a particular subscriber, such as the subscriber being provisioned for voice service and not data service via the network, or vice versa. The method may further include instructing the message server to route the message according to a standard delivery method for a message type of the message, if it is determined that the network is capable of delivering the message. The method may further include instructing the message server to route the message to a message conversion server computer, if the network connectivity server computer determines that the network is not capable of delivering the message. The message conversion server computer may be configured to convert the message into a new message type that the network is capable of delivering to the mobile device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
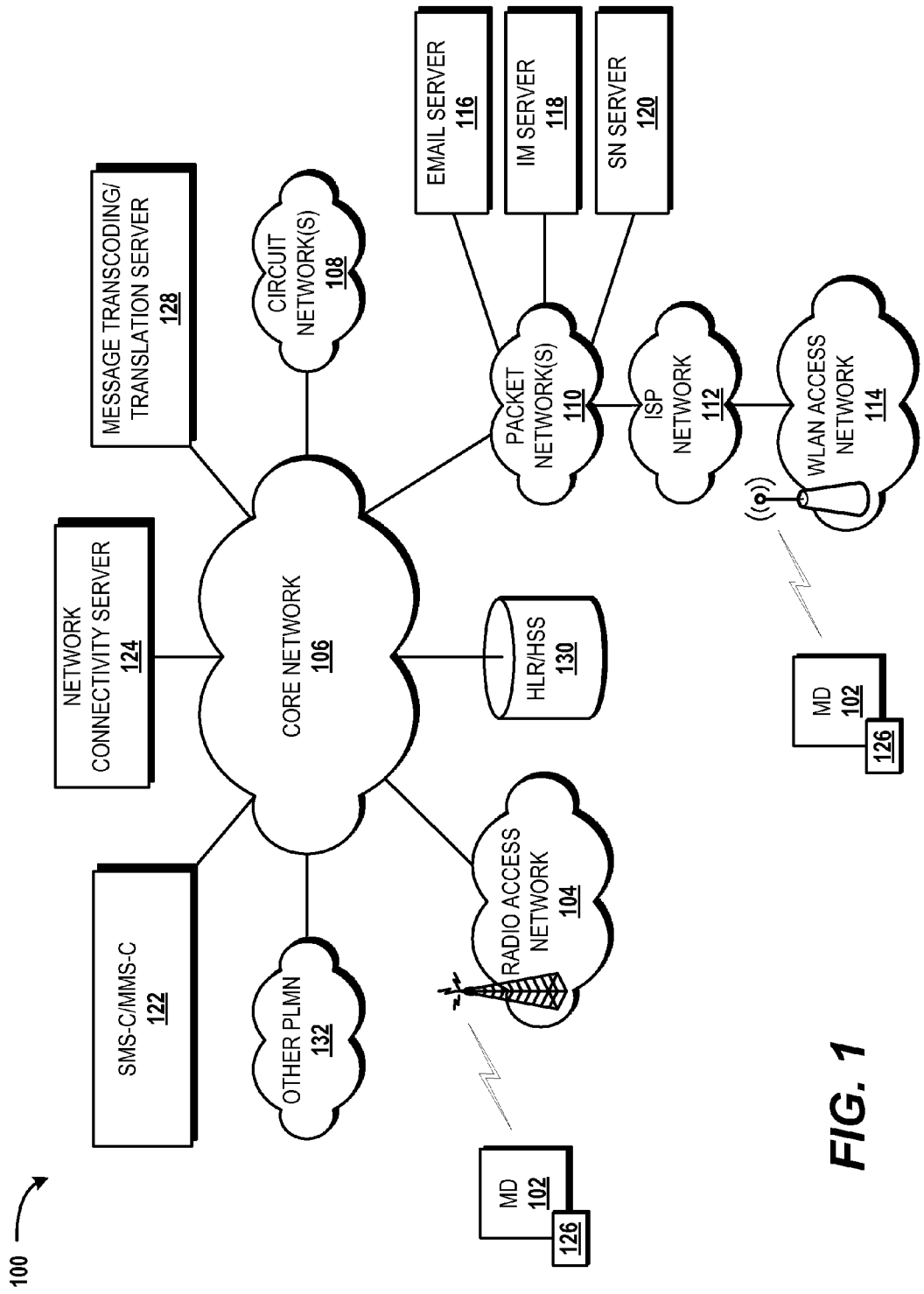
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, and the like.

In the following detailed description, references are made to the accompanying drawings that form a part hereof, and in which are shown by way of illustration specific embodiments or examples. Referring now to the drawings, in which like numerals represent like elements throughout the several figures, example aspects for intelligent message routing and delivery in a telecommunications network will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 may be available without departing from illustrative embodiments described herein. The operating environment 100 shown in FIG. 1 includes a mobile device 102 operating in communication with one or more radio access networks ("RANs") 104. The mobile device 102 may be a cellular telephone, a smart phone, a mobile computer, a tablet computer, or another computer or other computing device that is configured with an integrated or an external, removable access component that facilitates wireless communication with the RAN 104. In some embodiments, the access component may be a cellular telephone that is in wired or wireless communication with a computer to facilitate a tethered data connection to the RAN 104. In other embodiments, the access component may include a wireless transceiver configured to send and receive data from the RAN 104 and a universal serial bus ("USB") or another communication interface for connection to the computer to enable tethering. In any case, the mobile device 102 may be configured to wirelessly communicate with the RAN over an air interface in accordance with one or more radio access technologies. In some embodiments, the RAN 104 may be a Global System for Mobile communications RAN ("GRAN"), a GSM EDGE RAN ("GERAN"), a Universal Mobile Telecommunications System ("UMTS") Terrestrial Radio Access Network ("UTRAN"), a Long Term Evolution ("LTE") RAN, any combination thereof, or the like.

The RAN 104 may be in communication with a core network 106, which may include a circuit-switched core network ("CS CN"), a packet-switched core network ("PS CN"), and/or an IP multimedia subsystem ("IMS") core network. The core network 106 may utilize one or more mobile telecommunications technologies to provide voice and/or data services to the mobile device 102 via the RAN 104 to a WWAN component (not shown) of the mobile device 102. The mobile telecommunications technologies include, but are not limited to, GSM, Code Division Multiple Access ("CDMA") ONE, CDMA2000, UMTS, LTE, Worldwide Interoperability for Microwave Access ("Wi-MAX"), other 802.XX technologies, and the like. Moreover, the RAN 104 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and/or the like to provide access to the core network 106. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The core network 106 may be configured to provide voice and/or data communications with any combination of the above technologies. The core network 106 may be configured to or adapted to provide voice and/or data communications in accordance with future generation technologies.

The core network 106 may be in communication with one or more circuit networks 108, such as a public switched telephone network ("PSTN"), an integrated services digital network ("ISDN"), or other circuit-switched network. The core network 106 may also be in communication with one or more packet networks 110, such as an internet, the Internet, an intranet, or other packet-switched network.

The packet-switched network(s) 110 may be in communication with an internet service provider ("ISP") network 112, which may provide access to the packet network 110 for other packet-switched networks, such as a wireless local area network ("WLAN") access network 114. In some embodiments, the WLAN access network 114 may be configured to operate in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN may be implemented utilizing one or more wireless WI-FI access points. In some embodiments, one or more of the wireless WI-FI access points are another computing device, such as a cellular telephone, smart phone, computer, or tablet, that is functioning as a WI-FI hotspot, and that has connectivity to a wireless wide area network ("WWAN"), such as provided by the RAN 104 and the core network 106. Connections to WLAN access network 114 may be secured via various encryption technologies including, but not limited to, WI-FI Protected Access ("WPA"), WPA2, Wired Equivalent Privacy ("WEP"), and the like.

The packet-switched network(s) 110 may also be in communication with one or more email servers 116, one or more instant messaging ("IM") service servers 118, and one or more social networking ("SN") servers 120. In some embodiments, the servers 116, 118, 120 may be implemented as respective servers or computing systems including at least one respective computer. However, in other embodiments, two or more of the servers 116, 118, 120 may be implemented as components of the same server or computing system, including a network or cloud-computing system. The email server 116, the IM service server 118, and the SN server 120 may be configured to communicate with the mobile device 102 over the packet network(s) 110 via a data connection facilitated by the RAN 104 and the core network 106, and/or the ISP network 112 and the WLAN access network 114.

The email server 116 may be configured to deliver email to/from the mobile device 102. In some embodiments, the email server 116 may be configured to utilize one or more email protocols such as, but not limited to, post office protocol ("POP"), Internet mail access protocol ("IMAP"), simple mail transfer protocol ("SMTP"), hypertext transfer protocol ("HTTP"), or some combination thereof, to deliver email to and receive email from the mobile device 102. The email server 116 may also be configured to receive email messages that have been converted from another message type for delivery to the mobile device 102, as will be described in greater detail below.

The IM service server 118 may be configured to deliver an IM service via which a user of the mobile device 102 and one or more people can engage in a communication session to exchange text, images, voice, and/or video. In some embodiments, the IM service server 118 may be configured to utilize one or more IM protocols such as, but not limited, to Internet relay chat ("IRC"), Microsoft Messenger, available from MICROSOFT CORPORTATION, Windows Live Messenger, also available from MICROSOFT CORPORTATION, OSCAR, available from AOL, Skype protocol, available from Skype, available from MICROSOFT CORPORATION, Yahoo! Messenger, available from YAHOO, extensible messaging and presence protocol ("XMPP"), Facebook Messenger, available from FACEBOOK CORPORATION, or some combination thereof, to deliver instant messages to and receive instant messages from the mobile device 102. The IM service server 118 is also configured to receive IM messages that have been converted from another message type for delivery to the mobile device 102, as will be described in greater detail below.

The SN server 120 may be configured to deliver social networking messages to/from the mobile device 102. Social networking messages may include, but are not limited to, social networking status messages, social networking chat messages, social networking update messages, or some combination thereof. In some embodiments, the SN server 120 utilizes the email server 116 and/or the IM service server 118, and/or a similar server or computer to provide certain functionality for a social networking messaging infrastructure. For example, a social networking chat may utilize services provided by the IM service server 118 or a similar server integrated within the SN server 120. The SN server 120 is also configured to receive social networking messages that have been converted from another message type for delivery to the mobile device 102, as will be described in greater detail below.

It should be understood that the messages described herein may include content in the form of audio, video, text, image, and/or some combination thereof. It also should be understood that the messages may include an attachment including one or more of audio, video, text, image, and/or some combination thereof.

The core network 106 may also be in communication with a short messaging service center ("SMS-C") and a multimedia messaging service center ("MMS-C"), illustrated as a combined SMS-C/MMS-C 122. The SMS-C and the MMS-C may be the same network entity or respective separate network entities within the operating environment 100. The SMS-C/MMS-C 122 may be configured to deliver SMS and/or MMS messages to the mobile device 102. The SMS-C/MMS-C 122 may also be configured to receive SMS and/or MMS messages that have been converted from another message type for delivery to the mobile device 102, as will be described in greater detail below.

The core network 106 may also be in communication with a network connectivity server 124. The network connectivity server 124 may be configured to receive network identifiers from the mobile device 102 indicating to which network the mobile device 102 is connected. When the mobile device 102 is connected to a network, such as the RAN 104 or the WLAN access network 114, a client application 126 executing on the mobile device 102 may generate a network identifier and sends the network identifier to the network connectivity server 124 to identify the network to which the mobile device 102 is connected. Various network identifiers are described in greater detail below. In some embodiments, the network to which the mobile device 102 is connected provides a service, such as a data service, but the user of the mobile device 102 is not subscribed to that service or is otherwise not provisioned to utilize that service. Accordingly, in these embodiments, the network identifier may identify a network with an indication that only a portion of the capabilities (e.g., voice-only or data-only) of that network are available to the mobile device 102. A method for operating the mobile device 102 to provide a network identifier to the network connectivity server 124 is illustrated and described with reference to FIG. 2. A method for operating the network connectivity server 124 is illustrated and described with reference to FIG. 3.

In some embodiments, the network connectivity server 124 may be a presence server that is configured to store to maintain presence information for subscribers within a mobile telecommunications network. In an illustrative embodiment, the term "presence" may refer to the availability, activity level, or operating state of a mobile device and/or a user associated therewith. The ability for users to monitor each other's presence may be a feature offered in connection with some messaging applications, such as instant messaging application, social networking chat applications, and the like. For example, some messaging applications have a buddy list or contact list feature that displays a contact list and a presence status for each contact in the list. The presence status may indicate a user's availability and/or current activity so that others can determine whether to send a message to a particular contact. A presence status can include, but is not limited to, available, unavailable, do not disturb, idle, busy, offline or a custom status. Presence information may include a network identifier, or a network identifier may be provided in addition to presence information.

The core network 106 may also be in communication with a message transcoding/translation server 128. In some embodiments, the message transcoding/translation server 128 may be configured to convert one or more message types to one more different message types. For example, the message transcoding/translation server 128 may be configured to convert an email message received from the email server 116 into a SMS message and deliver the SMS message to the SMS-C/MMS-C 122 for delivery to the mobile device 102. The conversion process may utilize one or more translation and/or transcoding techniques to convert a message from one type to another. In some embodiments, speech-to-text or text-to-speech conversion may be utilized in the conversion. In some embodiments, short-hand or other abbreviated language may be used in character-limited message types, such as SMS. Example methods for operating the message transcoding/translation server 128 are illustrated and described with reference to FIGS. 5 and 6.

The core network 106 may also be in communication with a home location register ("HLR") and a home subscriber server ("HSS"), illustrated as a combined HLR/HSS 130. The HLR/HSS 130 may be shown as a combined network element for convenience and ease of illustration, although the HLR and the HSS may be separate network elements, according to an illustrative embodiment. The HLR/HSS 130 may include a database configured to provide routing information for mobile terminated calls and various messaging communications. In some embodiments, the HLR/HSS 130 includes a computer configured to support the HLR/HSS database functionality described herein. The HLR/HSS 130 may also be configured to maintain subscriber data that is distributed to the relevant visitor location register ("VLR") (not shown) or serving general packet radio service support node ("SGSN") (also not shown) through an attach process and to provide mobility management procedures, such as location area and routing area updates.

In some embodiments, the core network 106 is or includes an IMS network, as described above. The IMS network may include the HSS portion of the HLR/HSS 130. The HSS may be a master user database that stores subscription-related information, such as subscriber account details and subscriber profiles, performs authentication and authorization of the user, and provides information about a subscriber's location and IP address. In general, the HSS performs similar functions for an IMS network that an HLR provides for GSM and UMTS-based networks.

The core network 106 may also facilitate communication with one or more other public land mobile networks ("PLMNs") 132. The other PLMN 132 may be, for example, a foreign network, such as a mobile telecommunications network operated by another service provider or the same service provider that operates the core network 106. In some embodiments, the mobile device 102 may be configured to access voice and/or data services while roaming on the other PLMN 132. In some embodiments, the mobile device 102 may be roaming on the other PLMN 132, but only has access to circuit-switched based services such as making and receiving voice calls, receiving voice mail waiting indications, retrieving voice mail, and sending and receiving SMS messages. However, due to contractual agreements between the service provider of the core network 106 and the service provider of the other PLMN 132, or for some other reason, the mobile device 102 may lack packet-switched based services such as MMS, IM, and email while roaming on the other PLMN 132. In these embodiments, an incoming packet-based message can be converted at the message transcoding/translation server 128 into an SMS or other message type that is available to the mobile device 102 via the other PLMN 132.

Figure 2:
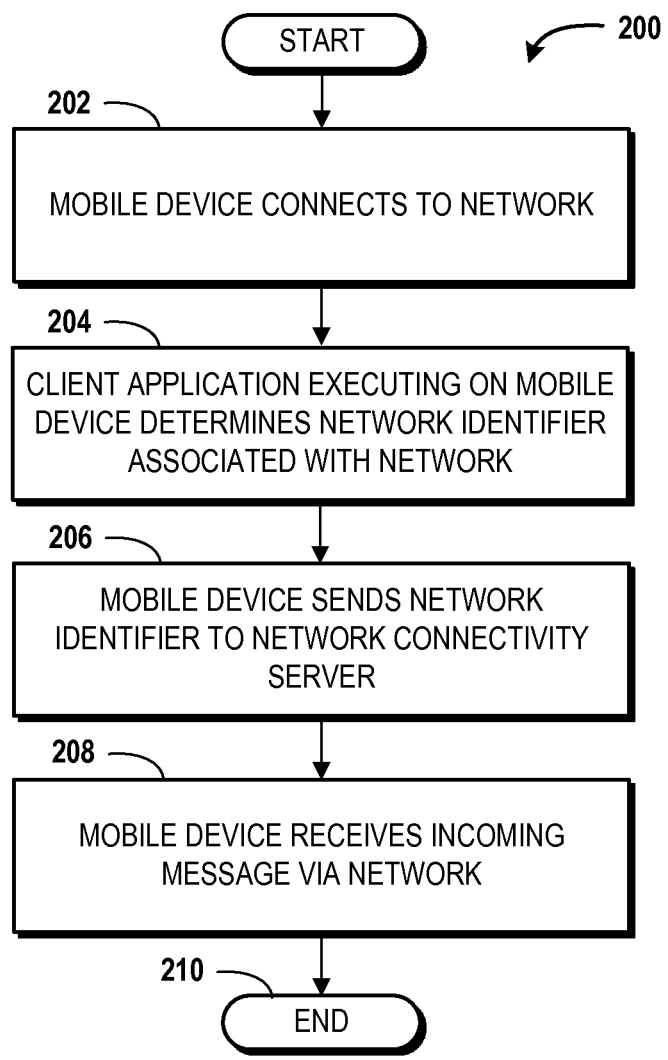
FIG. 2 is a flow diagram illustrating aspects of a method performed by a mobile device for notifying a network connectivity server of a network to which the mobile device is connected via a network identifier, according to an illustrative embodiment.

Turning now to FIG. 2, a flow diagram illustrating aspects of method 200 performed by the mobile device 102 for notifying the network connectivity server 124 of a network to which the mobile device 102 is connected via a network identifier will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, at least in part, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, software, application modules, program modules, programs, components, data structures, algorithms, and the like. Computer-readable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 begins and proceeds to operation 202, wherein the mobile device 102 may connect to a network through the RAN 104, the WLAN access network 114, or another access network. In response to establishing a connection to the network, the client application 126 executing on the mobile device 102 determines a network identifier associated with the network at operation 204. For embodiments in which the network is the RAN 104 or the like, the client application 126 may determine a network identifier that identifies the network as being an IP packet data network, a voice network, or a combination thereof. This may be determined at least in part by the client application 126 analyzing one or more connection settings established on the mobile device 102. The connection settings include, but are not limited to, an access point name ("APN") identifying a packet data network to which the RAN 104 provides access, a network address for a proxy server to which the mobile device 102 is connected via the network to provide a service such as MMS messaging via the SMS-C/MMS-C 122, a network name, a network provider name, a cell identifier ("cell ID") for a cell to which the mobile device 102 is connected, a location area identifier ("LAI"), or a combination thereof. In some embodiments, the absence of one or more connection settings, such as a setting that indicates a data connection is available, facilitates the client application 126 to determine that a data connection is not available. The corresponding network identifier may indicate a voice-only network.

For embodiments in which the network is the WLAN access network 114, the client application 126 executing on the mobile device 102 may determine a network identifier that identifies the network via a network name, a service set identifier ("SSID"), an ISP name, an IP address, or some combination thereof. This may be determined at least in part by the client application 126 analyzing WI-FI connection settings established on the mobile device.

From operation 204, the method 200 proceeds to operation 206, wherein the mobile device 102 may send the network identifier to the network connectivity server 114.

From operation 206, the method 200 proceeds to operation 208, wherein the mobile device 102 may receive an incoming message via the network. The type of incoming message may be based, at least in part, upon the capability of the network to deliver the incoming message to the mobile device 102, as will be described in greater detail below. The method 200 then proceeds to operation 210. The method 200 ends at operation 210.

Figure 3:
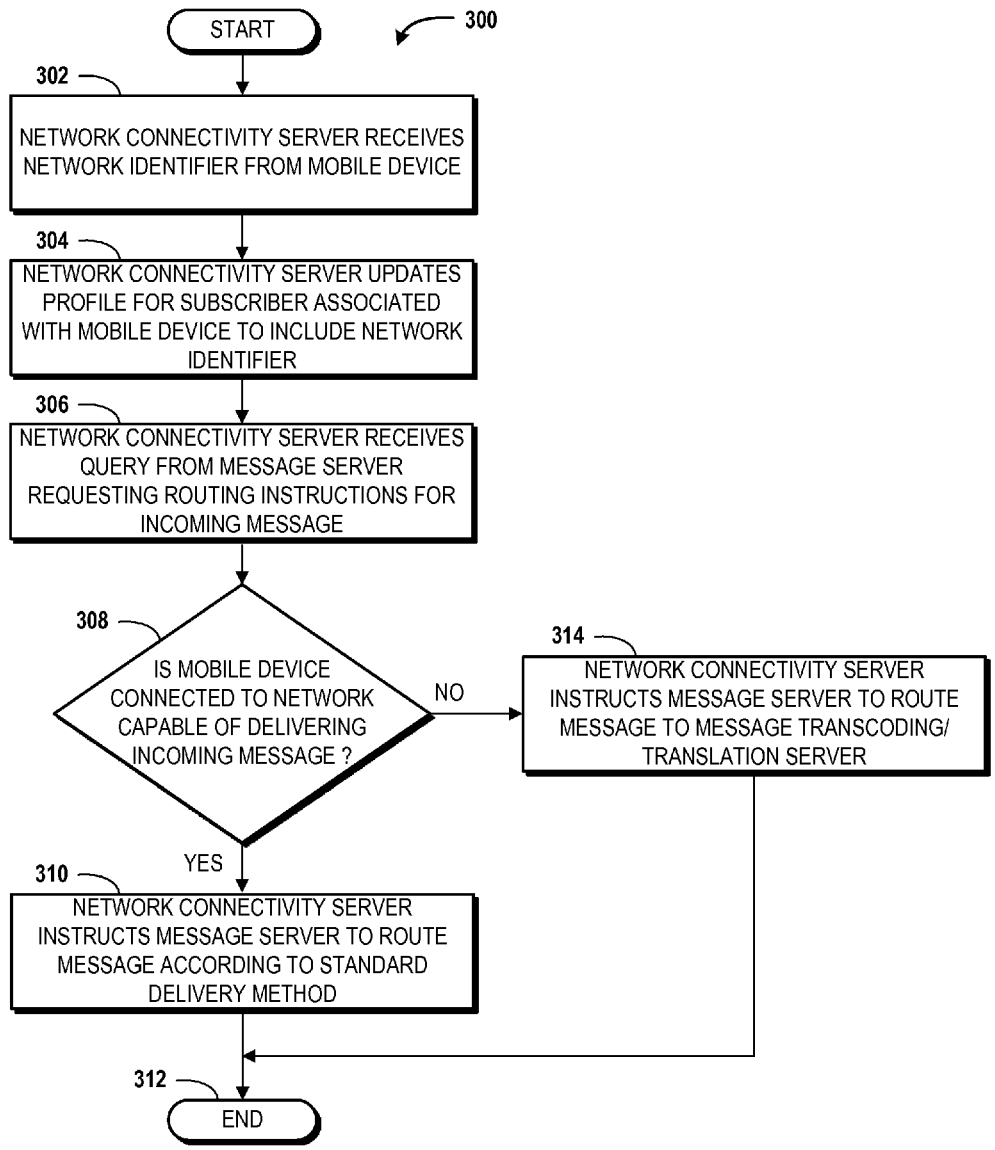
FIG. 3 is a flow diagram illustrating aspects of a method performed by a network connectivity server for providing routing instructions to a message server instructing the message server to route an incoming message via a standard delivery method or to route a message transcoding/translation server based upon a network identifier received from a mobile device, according to an illustrative embodiment.

Turning now to FIG. 3, a flow diagram illustrating aspects of a method 300 for a method 300 performed by the network connectivity server 124 for providing routing instructions to a message server instructing the message server to route an incoming message via a standard delivery method or to route the message to the message transcoding/translation server 128 based upon the network identifier received from the mobile device 102 will be described, according to an illustrative embodiment. The message server to which the network connectivity server 124 provides instructions may be the email server 116, the IM server 118, the SN server 120, the SMS-C/MMS-C 122, or some other server or network element configured to provide a messaging capability to the network. For example, the message server may be a traditional voice mail system or a visual voice mail system.

The method 300 begins and proceeds to operation 302, wherein the network connectivity server 124 receives the network identifier from the mobile device 102. In response to receiving the network identifier from the mobile device 102, the network connectivity server 124, at operation 304, updates a profile for a subscriber associated with the mobile device 102 to include the network identifier. If a profile is not available for the subscriber, the network connectivity server 124 can create a profile at this time and include the network identifier in the profile. The profile stored by the network connectivity server 124, in some embodiments, may be updated to include information received from other network elements, such as the HLR/HSS 130 in regard to network connectivity information. In some embodiments, the network identifier provided by the mobile device 102 may supersede any indication of a particular network to which the mobile device 102 is connected as identified by the HLR/HSS 130 or other network element.

From operation 304, the method 300 proceeds to operation 306, wherein the network connectivity server 124 may receive a query from a message server. The message server may be the SMS-C/MMS-C 122, the email server 116, the IM server 118, the social networking server 120, a voice mail server, or another message server. The query may include a request for routing instructions for an incoming message, which includes the mobile device 102 as the intended recipient device.

From operation 306, the method 300 proceeds to operation 308, wherein the network connectivity server 124 may determine if the mobile device 102 is connected to a network that is capable of delivering the incoming message to the mobile device 102. In some embodiments, the determination of whether the network is capable of delivering the incoming message may be a determination based upon a technical limitation of the network. For example, if the network is a circuit-switched network, the network may be considered to be incapable of delivering messages to the mobile device 102 that require a packet-switched network for delivery. By way of additional example, if the incoming message is an SMS message and the network identifier identifies the mobile device 102 as being connected to a WLAN, the network connectivity server 124 may determine that the network is considered to be incapable of delivering the incoming message to the mobile device 102. By way of contrasting example, if the incoming message is an email message and the network identifier identifies the mobile device 102 as being connected to a WLAN or to another network that supports data, the network connectivity server 124 may determine that the network is capable of delivering the incoming message to the mobile device 102.

In some embodiments, the determination of whether the network is capable of delivering the incoming message may be a determination based upon a capability of the network for a particular network subscriber. For example, if the subscriber associated with the mobile device 102 only has a voice and SMS subscription, the network may be considered to be incapable of delivering messages to the mobile device 102 that require a data connection for that subscriber. In some embodiments, the determination of whether the network is capable of delivering the incoming message may be based upon a subscriber preference. For example, if the subscriber has set a subscriber preference to utilize a WI-FI network instead of a cellular network for incoming messages, the network may be considered to be incapable of delivering cellular based messages, such as SMS or MMS, to the mobile device 102 for that subscriber based upon the subscriber preference.

In some embodiments, the mobile device 102 is a dual-mode mobile device configured to establish simultaneous connections to a WI-FI network and a cellular network. In some embodiments, the mobile device 102 is connected to a WI-FI network and cellular network access is disabled, or vice versa. In some embodiments, the mobile device 102 is registered in both a WI-FI network and a cellular network. In some embodiments, the determination of whether the network is capable of delivering the incoming message is based upon a subscriber connected network capability. For example, if the mobile device 102 is connected to a WI-FI network instead of a cellular network, the network is considered to be incapable of delivering cellular based messages, such as SMS or MMS, to the mobile device 102 for that subscriber.

If the network connectivity server 124 determines, at operation 308, that the mobile device is connected to a network that is capable of delivering the incoming message, the method 300 proceeds from operation 308 to operation 310, wherein the network connectivity server 124 may instruct the message server to route the incoming message to the mobile device 102 according to the standard delivery method for the incoming message. For example, if the incoming message is an email message, the email server 116 may send the incoming message to the mobile device 102 utilizing an email protocol such as, but not limited to, POP or IMAP. Similarly, if the message is an SMS message, for example, the message may be delivered via SMS protocol. In any case, the method 300 then proceeds to operation 312. The method 300 ends at operation 312.

If the network connectivity server 124 determines, at operation 308, that the mobile device 102 is not connected to a network that is capable of delivering the incoming message, the method 300 proceeds from operation 308 to operation 314, wherein the network connectivity server 124 may instruct the message server to route the message to the message transcoding/translation server 128. The method 300 then proceeds to operation 312, wherein the method 300 ends.

Figure 4:
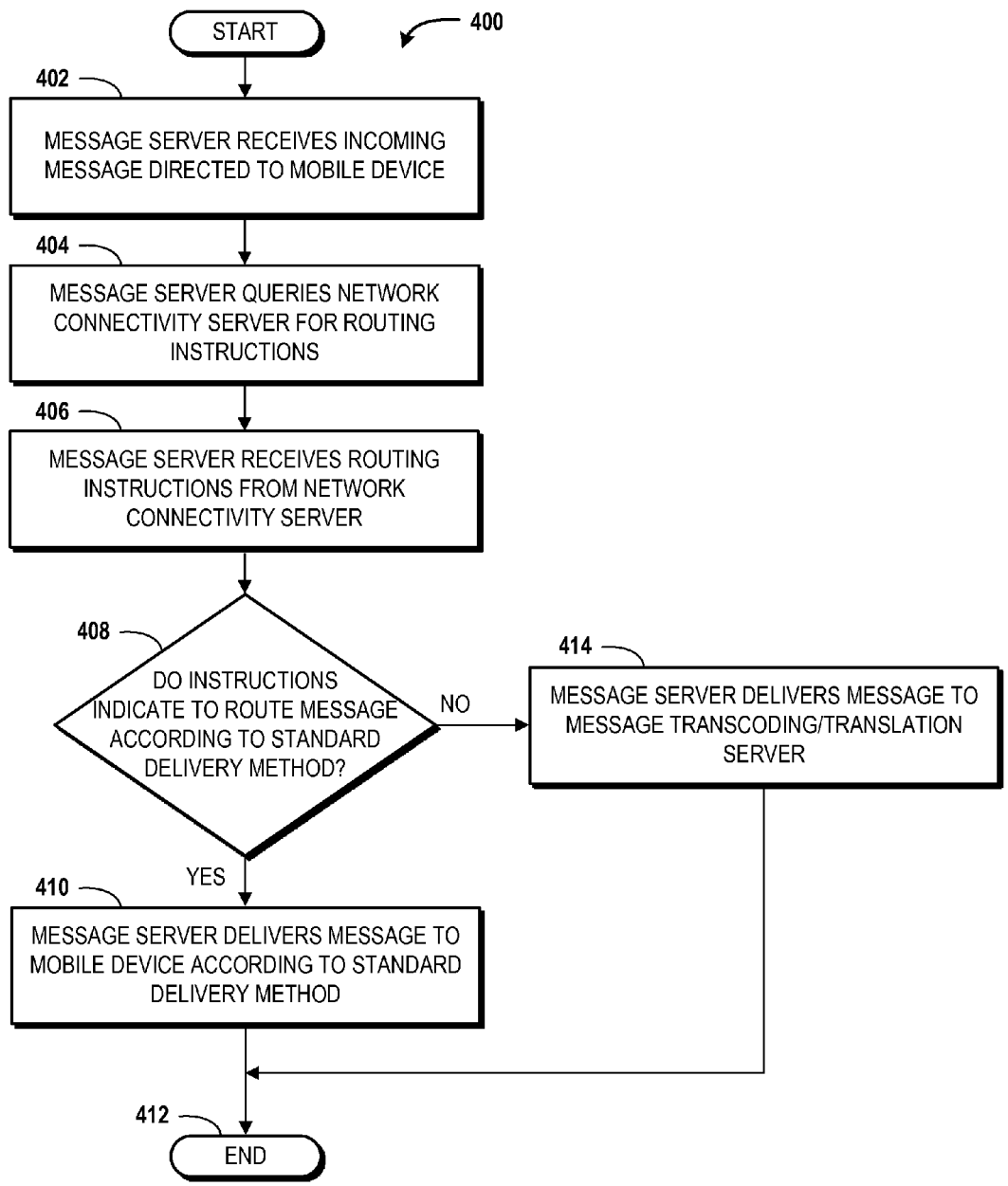
FIG. 4 is a flow diagram illustrating aspects of a method performed by a message server for querying a network connectivity server for routing instructions and routing an incoming message via a standard delivery method or to a message transcoding/translation server based upon the routing instructions, according to an illustrative embodiment.

Turning now to FIG. 4, a flow diagram illustrating aspects of a method 400 performed by a message server for querying the network connectivity server 124 for routing instructions and routing an incoming message via a standard delivery method or to the message transcoding/translation server 128 based upon the routing instructions will be described, according to an illustrative embodiment. The method 400 begins and proceeds to operation 402, wherein the message server receives the incoming message directed to the mobile device 102. The message server may be the SMS-C/MMS-C 122, the email server 116, the IM server 118, the social networking server 120, a voice mail server, or another message server.

From operation 402, the method 400 proceeds to operation 404, wherein the message server may query the network connectivity server 124 for routing instructions. From operation 404, the method 400 proceeds to operation 406, wherein the message server receives routing instructions from the network connectivity server 124. The message server, at operation 408, determines if the instructions received from the network connectivity server 124 indicate that the incoming message is to be routed according to a standard delivery method. If the network connectivity server 124 determines, at operation 408, that the instructions received in operation 406 indicate that the incoming message is to be routed according to a standard delivery method, the method 400 proceeds to operation 410, wherein the message server delivers the incoming message to the mobile device 102 according to the standard delivery method. From operation 410, the method 400 proceeds to operation 412. The method 400 ends at operation 412.

If, however, the network connectivity server 124 determines, at operation 408, that the instructions received in operation 406 do not indicate that the incoming message is to be routed according to a standard delivery method, the method 400 proceeds to operation 414, wherein the message server delivers the message to the message transcoding/translation server 128. The method 400 then proceeds to operation 412, wherein the method 400 ends.

Figure 5:
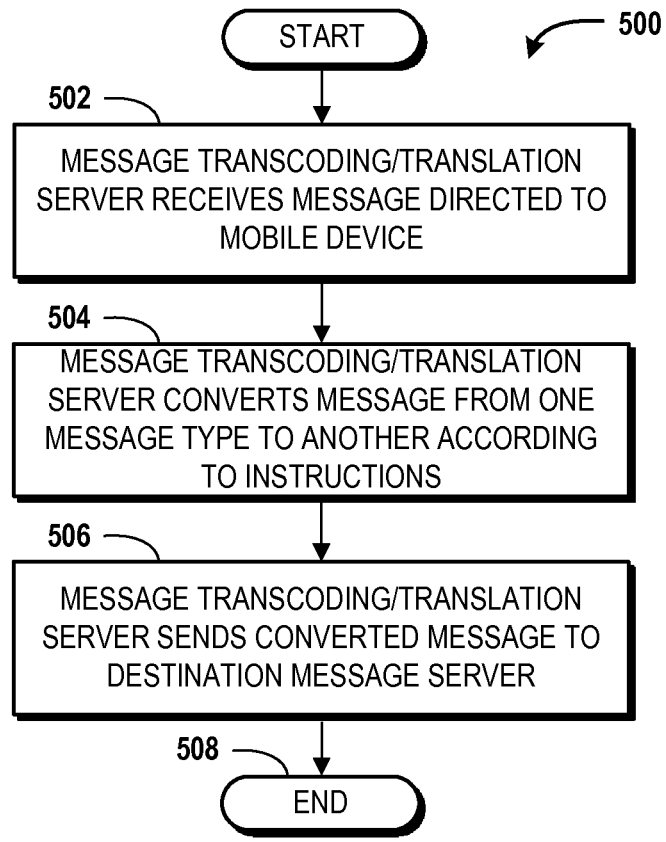
FIG. 5 is a flow diagram illustrating aspects of a method performed by a message transcoding/translation server for converting a message according to a destination message server and sending the converted message to the destination message server, according to an illustrative embodiment.

Turning now to FIG. 5, a flow diagram illustrating aspects of a method 500 performed by the message transcoding/translation server 128 for converting the incoming message according to a destination message server and sending the converted message to the destination message server will be described, according to an illustrative embodiment. The destination message server may be the SMS-C/MMS-C 122, the email server 116, the IM server 118, the social networking server 120, a voice mail server, or another message server that is configured to handle the message type of the converted message.

The method 500 begins and proceeds to operation 502, wherein the message transcoding/translation server 128 receives the message directed to the mobile device 102. In some embodiments, the message may include or has associated therewith instructions from the message server or from the network connectivity server 124 that indicate the message type to which the message should be converted. In addition or in the alternative, the instructions may include an identifier for the destination message server, according to an illustrative embodiment. In such embodiments, the message transcoding/translation server 128 can determine, based upon the identifier for the destination message server, a message type to which the message should be converted.

From operation 502, the method 500 proceeds to operation 504, wherein the message transcoding/translation server 128 converts the message from one message type to another message type according to the instructions. From operation 504, the method 500 proceeds to operation 506, wherein the message transcoding/translation server 128 sends the converted message to the destination message server. The method 500 then proceeds to operation 508. The method 500 ends at operation 508.

Figure 6:
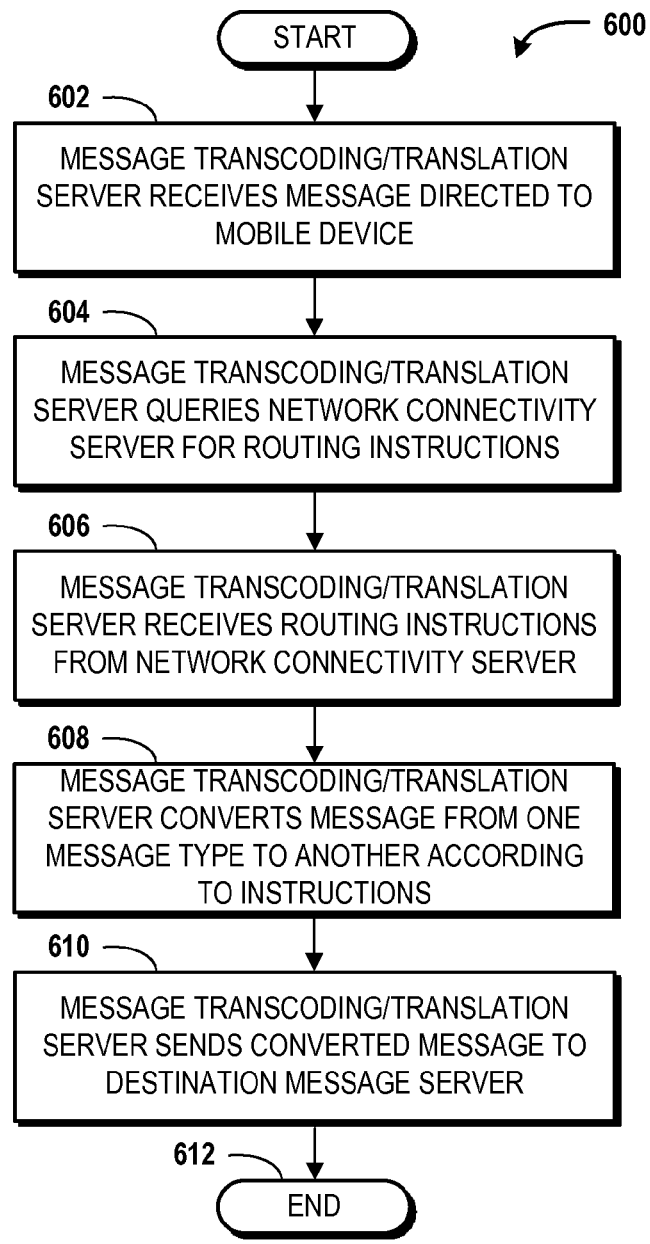
FIG. 6 is a flow diagram illustrating aspects of a method performed by a message transcoding/translation server for converting a message according to a destination message server and sending the converted message to the destination message server, according to another illustrative embodiment.

Turning now to FIG. 6, a flow diagram illustrating aspects of a method 600 performed by the message transcoding/translation server 128 for converting the incoming message according to a destination message server and sending the converted message to the destination message server will be described, according to another illustrative embodiment. The destination message server may be the SMS-C/MMS-C 122, the email server 116, the IM server 118, the social networking server 120, a voice mail server, or another message server that is configured to handle the message type of the converted message.

The method 600 begins and proceeds to operation 602, wherein the message transcoding/translation server 128 receives the incoming message directed to the mobile device 102. From operation 602, the method 600 proceeds to operation 604, wherein the message transcoding/translation server 128 queries the network connectivity server 124 for routing instructions. From operation 604, the method 600 proceeds to operation 606, wherein the message transcoding/translation server 128 receives routing instructions from the network connectivity server 124. In some embodiments, the instructions include an indication of the message type to which the message should be converted. In addition or in the alternative, the instructions may include an identifier for the destination message server, according to an illustrative embodiment. In these embodiments, the message transcoding/translation server 128 can determine, based upon the identifier for the destination message server, a message type to which the message should be converted.

From operation 606, the method 600 proceeds to operation 608, wherein message transcoding/translation server 128 convert the message from one message type to another message type according to the instructions. From operation 608, the method 600 proceeds to operation 610, wherein the message transcoding/translation server 128 sends the converted message to the destination message server. The method 600 then proceeds to operation 612. The method 600 ends at operation 612.

Figure 7:
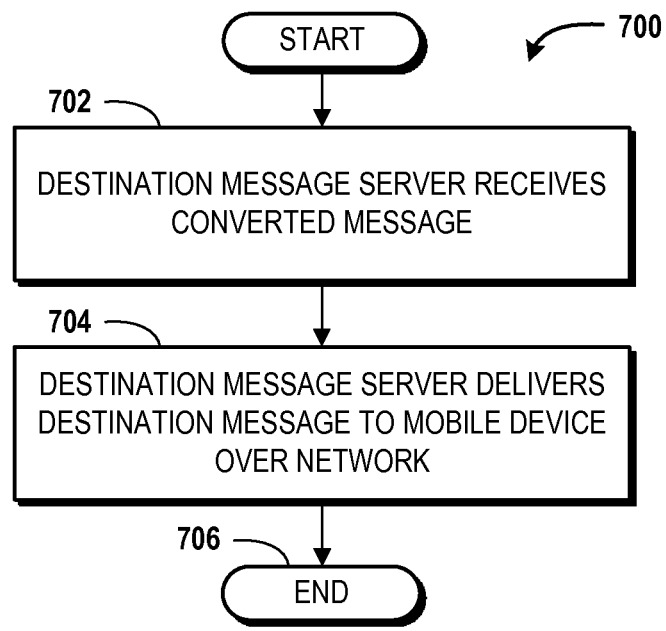
FIG. 7 is a flow diagram illustrating aspects of a method performed by a destination message server for delivering a converted message to a mobile device, according to an illustrative embodiment.

Turning now to FIG. 7, a flow diagram illustrating aspects of a method 700 performed by the destination message server for delivering a converted message to the mobile device 102 will be described, according to an illustrative embodiment. The method 700 begins and proceeds to operation 702, wherein the destination message server receives the converted message from the message transcoding/translation server 128. From operation 702, the method 700 proceeds to operation 704, wherein the destination message server delivers the destination message to the mobile device 102 over the network to which the mobile device 102 is connected. The method 700 then proceeds to operation 706. The method 700 ends at operation 706.

Figure 8:
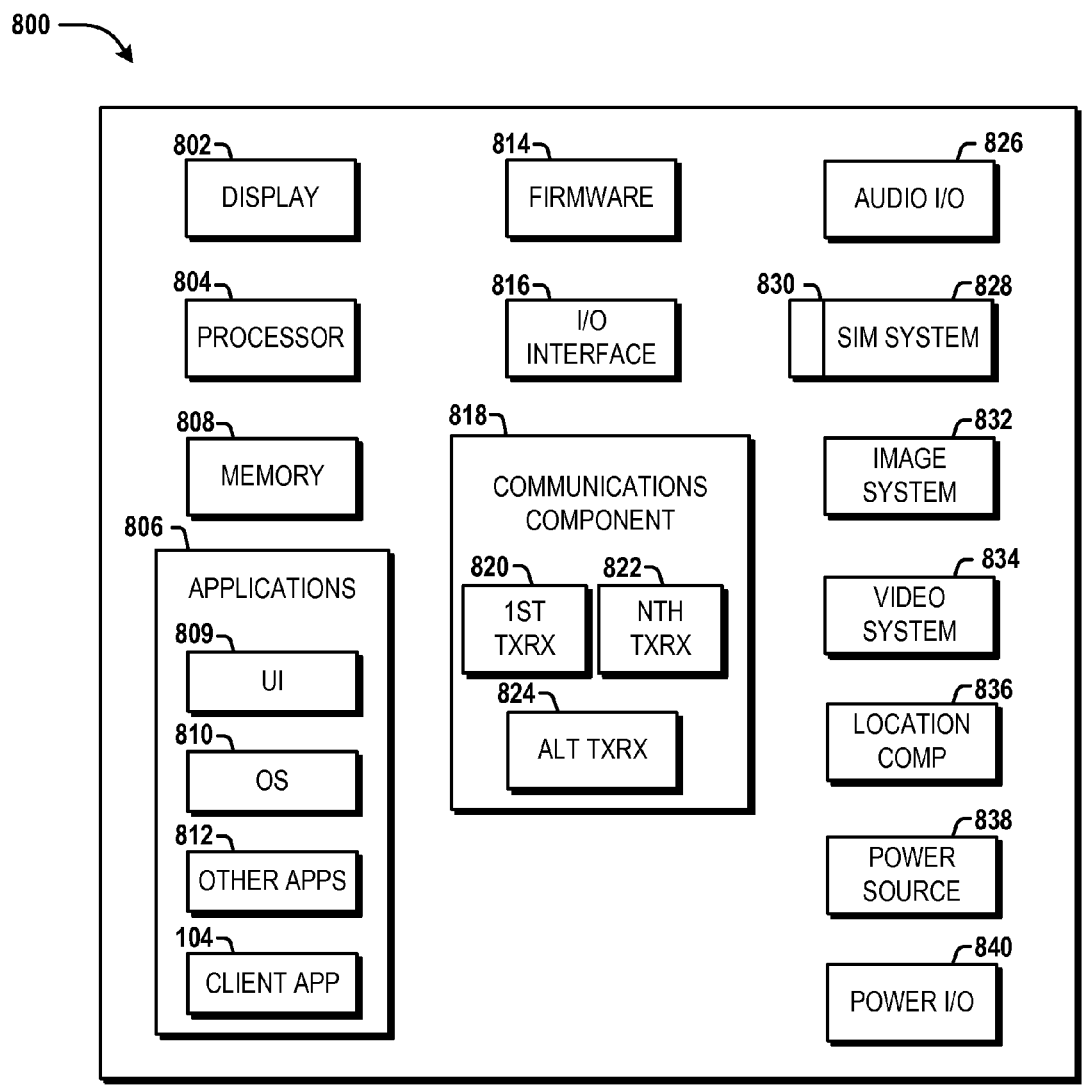
FIG. 8 is a mobile device architecture diagram illustrating an illustrative mobile device hardware and software architecture for a mobile device capable of implementing aspects of the embodiments disclosed herein.

Turning now to FIG. 8, an illustrative mobile device 800 and components thereof will be described. Although connections are not shown between the components illustrated in FIG. 8, the components can interact with each other to carry out device functions. In some embodiments, for example, the components are arranged so as to communicate via one or more busses (not shown). It should be understood that FIG. 8 and the following description are intended to provide a general understanding of a suitable environment in which various aspects of embodiments can be implemented. The mobile device 102 described herein above may be configured like the mobile device 800. It should be understood that the mobile device 102 may include additional functionality or include less functionality than now described.

As illustrated in FIG. 8, the mobile device 800 includes a display 802 for displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 800 also includes a processor 804 for processing data and/or executing computer-executable instructions of one or more applications 806 stored in a memory 808. In some embodiments, the applications 806 include a UI application 809. The UI application 809 interfaces with an operating system ("OS") application 810 to facilitate user interaction with device functionality and data. In some embodiments, the OS application 810 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

The UI application 809 aids a user in entering message content, viewing received messages, answering/initiating calls, entering/deleting data, entering and setting user IDs and passwords for device access, configuring settings, manipulating address book content and/or settings, multimode interaction, interacting with other applications 812, and otherwise facilitating user interaction with the OS application 810, the other applications 812, and the client application 126.

In some embodiments, the other applications 812 include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 806 or portions thereof are stored in the memory 808 and/or in a firmware 814, and are executed by the processor 804. The firmware 814 may also store code for execution during device power up and power down operations.

The mobile device 800 also includes an input/output ("I/O") interface 816 for the input/output of data such as location information, presence status information, user IDs, passwords, and application initiation (start-up) requests. In some embodiments, the I/O interface 816 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 800 is configured to synchronize with another device (e.g., a computer) to transfer content stored to/from the mobile device 800. In some embodiments, the mobile device 800 is configured to receive updates to one or more of the applications 806 via the I/O interface 816. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device instead of, or in addition to, a communications component 818.

The communications component 818 interfaces with the processor 804 to facilitate wireless communications with one or more networks such as those illustrated in FIG. 1. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers each configured to communicate over the same or a different wireless technology standard. For example, the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like. In addition, the communications component 818 may facilitate data communications using GPRS, EDGE, the HSPA protocol family including HSDPA, EUL or otherwise termed HSUPA, HSPA+, and various other current and future wireless data access standards.

In the illustrated embodiment, the communications component 818 includes a first cellular transceiver 820 that operates in one mode (e.g., GSM), and an $N^{th}$ cellular transceiver 822 operates in a different mode (e.g., UMTS). While only two cellular transceivers 820, 822 are illustrated, it should be appreciated that more than two transceivers can be included in the communications component 818.

The illustrated communications component 818 also includes an alternative communications transceiver 824 for use by other communications technologies including WI-FI, WIMAX, BLUETOOTH, infrared, infrared data association ("IRDA"), near field communications ("NFC"), other RF, combinations thereof, and the like. In some embodiments, the communications component 818 also facilitates reception from terrestrial radio networks, digital satellite radio networks, internet-based radio service networks, combinations thereof, and the like.

The communications component 818 processes data from a network such as an internet, an intranet, a home broadband network, a WI-FI hotspot, and the like, via an internet service provider ("ISP"), digital subscriber line ("DSL") provider, or broadband provider.

Audio capabilities for the mobile device 800 may be provided by an audio I/O component 826 that includes a speaker for the output of audio signals and a microphone to collect audio signals.

The illustrated mobile device 800 also includes a USIM system 828 that includes a SIM slot interface 830 for accommodating a USIM card. In some embodiments, the USIM system 828 is configured to accept insertion of other SIM cards for access to other network types such as GSM. In other embodiments, the USIM system 828 is configured to accept multiple SIM cards. In still other embodiments, the USIM system 828 is configured to accept a universal integrated circuit card ("UICC") with one or more SIM applications stored thereupon.

The mobile device 800 may also include an image capture and processing system 832 ("image system"). Photos may be obtained via an associated image capture subsystem of the image system 832, for example, a camera. The mobile device 800 may also include a video system 834 for capturing, processing, recording, and/or modifying video content. Photos and videos obtained using the image system 832 and the video system 834, respectively, may be added as message content to a multimedia message service ("MMS") message and sent to another mobile device.

The illustrated mobile device 800 also includes a location component 836 for sending and/or receiving signals such as global positioning system ("GPS") data, assisted-GPS data, WI-FI/WIMAX and/or cellular network triangulation data, combinations thereof, and the like, for determining a location of the mobile device 800. The location component 836 may communicate with the communications component 818 to retrieve triangulation data for determining a location of the mobile device 800. In some embodiments, the location component 836 interfaces with cellular network nodes, telephone lines, satellites, location transmitters and/or beacons, wireless network transmitters and receivers, combinations thereof, and the like. In some embodiments, the location component 836 includes one or more sensors such as a compass, an accelerometer, and/or a gyroscope to determine the orientation of the mobile device 800. Using the location component 836, the mobile device 800 can generate and/or receive data to identify its location, or transmit data used by other devices to determine the location of the mobile device 800. The location component 836 may include multiple components for determining the location and/or orientation of the mobile device 800.

The illustrated mobile device 800 also includes a power source 838, such as one or more batteries and/or other power subsystem (AC or DC). The power source 838 may interface with an external power system or charging equipment via a power I/O component 840.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system described below with reference to FIG. 9. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 800 in order to store and execute the software components presented herein. It is also contemplated that the mobile device 800 may not include all of the components shown in FIG. 8, may include other components that are not explicitly shown in FIG. 8, or may utilize an architecture completely different than that shown in FIG. 8.

Figure 9:
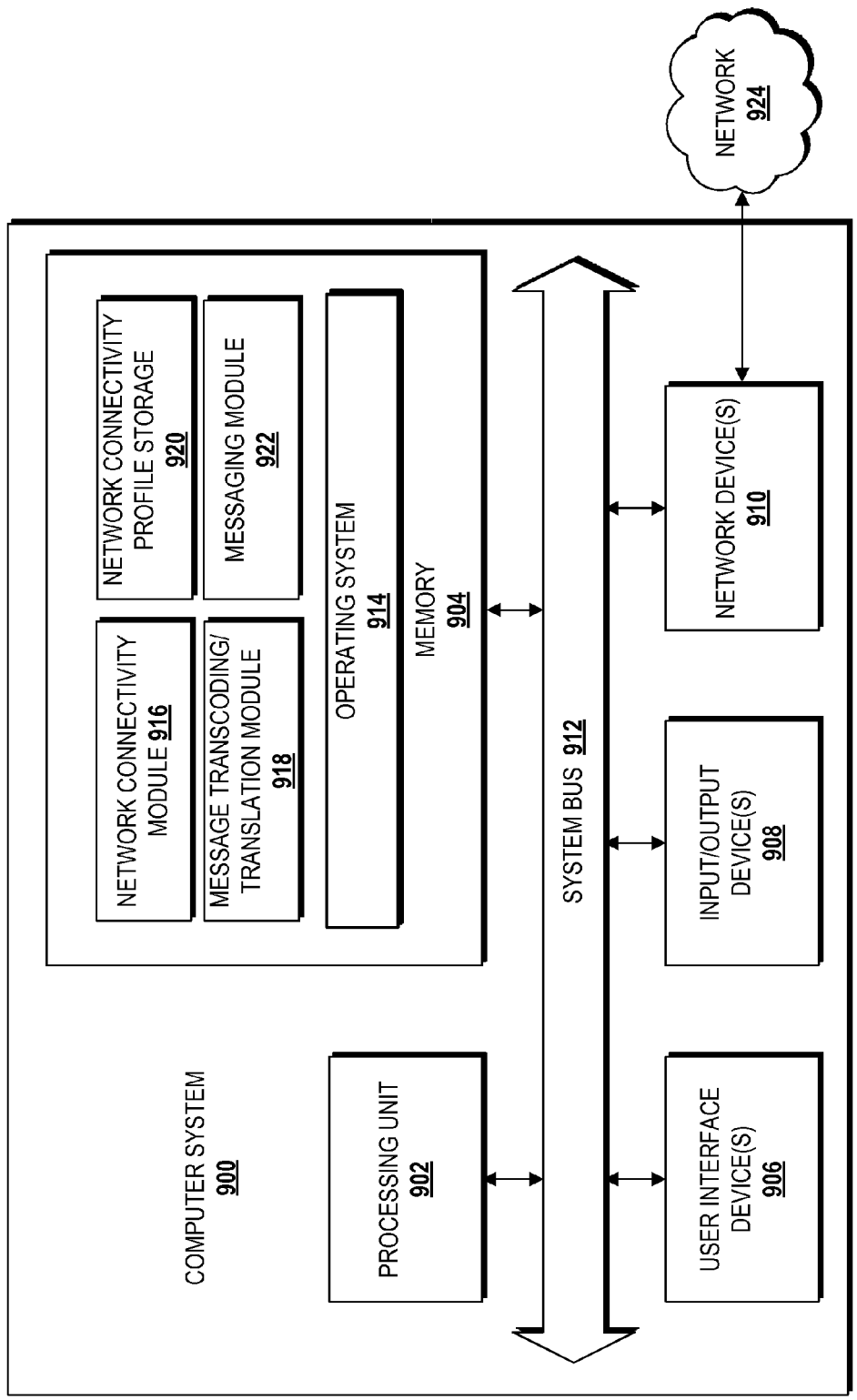
FIG. 9 is a computer architecture diagram illustrating an illustrative computer hardware and software architecture for a computing system capable of implementing aspects of the embodiments presented herein.

FIG. 9 is a block diagram illustrating a computer system 900 configured to perform various operations disclosed herein. The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the computer system 900. Processing units are generally known, and therefore are not described in further detail herein.

The memory 904 communicates with the processing unit 902 via the system bus 912. In some embodiments, the memory 904 is operatively connected to a memory controller (not shown) that enables communication with the processing unit 902 via the system bus 912. The illustrated memory 904 includes an operating system 914 and one or more program modules, including a network connectivity module 916, a message transcoding/translation module 918, a network connectivity profile storage 920, and a messaging module 922. It should be understood that although the network connectivity module 916, the message transcoding/translation module 918, the network connectivity profile storage 920, and the messaging module 922 are illustrated as being included in the memory 904, in implementation, these modules would be included in the appropriate computer or device. For example, the network connectivity module 916 and the network connectivity profile storage 920 would be included in the network connectivity server 124; the message transcoding/translation module 918 would be included in the message transcoding/translation server 128; and the messaging module 922 would be included in the message servers described herein and be configured according to the message type(s) provided by a given message server. The modules 916, 918, 922 are configured to be executed by the processing unit 902 to perform the respective operations described herein above, for example, with reference to the methods 200, 300, 400, 500, 600, 700.

The operating system 914 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 906 may include one or more devices with which a user accesses the computer system 900. The user interface devices 906 may include, but are not limited to, computers, servers, personal digital assistants, telephones (e.g., cellular, IP, or landline), or any suitable computing devices. The I/O devices 908 enable a user to interface with the program modules. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network 924, such as one or more of the networks illustrated and described with reference to FIG. 1 or some other network. Examples of the network devices 910 include, but are not limited to, a modem, a radio frequency ("RF") or infrared ("IR") transceiver, a telephonic interface, a bridge, a router, or a network card. The network 924 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 924 may be a wired network such as, but not limited to, a wide area network ("WAN") such as the Internet, a local area network ("LAN") such as the Ethernet, a wired personal area network ("PAN"), or a wired metropolitan area network ("MAN").

The network 924 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 924. Therefore, the embodiments presented herein should not be construed as being limited to a particular mobile telecommunications technology and/or standards utilizing such technologies.

Based on the foregoing, it should be appreciated that technologies for intelligent message routing in a telecommunications network have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method comprising:
    receiving, by a message conversion server computer comprising a processor, a message directed to a mobile device;
    receiving, by the message conversion server computer, first instructions for converting the message from a first message type into a second message type handled by a destination message server;
    receiving, at the message conversion server computer, second instructions for routing the message to the destination message server;
    converting, by the message conversion server computer, the message from the first message type to the second message type in accordance with the first instructions, wherein the first message type is incapable of being delivered over a network to which the mobile device is connected; and
    sending, by the message conversion server computer, the message in the second message type to the destination message server that supports delivery of messages of the second message type to the mobile device over the network.

2. The method of claim 1, wherein the first message type is a multimedia messaging service message, an instant messaging service message, an email message, or a social networking message.

3. The method of claim 2, wherein the second message type is a short messaging service message or a voice mail message.

4. The method of claim 1, wherein the first message type is a short messaging service message or a voice mail message.

5. The method of claim 4, wherein the second message type is a multimedia messaging service message, an instant messaging service message, an email message, or a social networking message.

6. A message conversion server computer comprising:
   a processor; and
   a memory comprising computer-executable instructions that, when executed by the processor, cause the processor to perform operations comprising:
      receiving a message directed to a mobile device,
      receiving first instructions for converting the message from a first message type into a second message type handled by a destination message server,
      receiving second instructions for routing the message to the destination message server,
      converting the message from the first message type to the second message type in accordance with the first instructions, wherein the first message type is incapable of being delivered over a network to which the mobile device is connected, and
      sending the message in the second message type to the destination message server that supports delivery of messages of the second message type to the mobile device over the network.

7. The message conversion server computer of claim 6, wherein the first message type is a multimedia messaging service message, an instant messaging service message, an email message, or a social networking message.

8. The message conversion server computer of claim 7, wherein the second message type is a short messaging service message or a voice mail message.

9. The message conversion server computer of claim 6, wherein the first message type is a short messaging service message or a voice mail message.

10. The message conversion server computer of claim 9, wherein the second message type is a multimedia messaging service message, an instant messaging service message, an email message, or a social networking message.

11. A computer-readable storage medium comprising computer-readable instructions that, when executed by a processor of a message conversion server computer, cause the message conversion server computer to perform operations comprising:
   receiving a message directed to a mobile device;
   receiving first instructions for converting the message from a first message type into a second message type handled by a destination message server;
   receiving second instructions for routing the message to the destination message server;
   converting the message from the first message type to the second message type in accordance with the first instructions, wherein the first message type is incapable of being delivered over a network to which the mobile device is connected; and
   sending the message in the second message type to the destination message server that supports delivery of messages of the second message type to the mobile device over the network.

12. The computer-readable storage medium of claim 11, wherein the first message type is a multimedia messaging service message, an instant messaging service message, an email message, or a social networking message.

13. The computer-readable storage medium of claim 12, wherein the second message type is a short messaging service message or a voice mail message.

14. The computer-readable storage medium of claim 11, wherein the first message type is a short messaging service message or a voice mail message.

15. The computer-readable storage medium of claim 14, wherein the second message type is a multimedia messaging service message, an instant messaging service message, an email message, or a social networking message.

* * * * *